July 5, 1932. L. H. DAWSON 1,866,454
METHOD AND APPARATUS FOR DETERMINING THE DIRECTION
OF THE ELECTRIC AXES OF CRYSTAL QUARTZ
Filed Dec. 3, 1928 4 Sheets-Sheet 1

Inventor:
Leo H. Dawson
by Harold Dodd Atty.

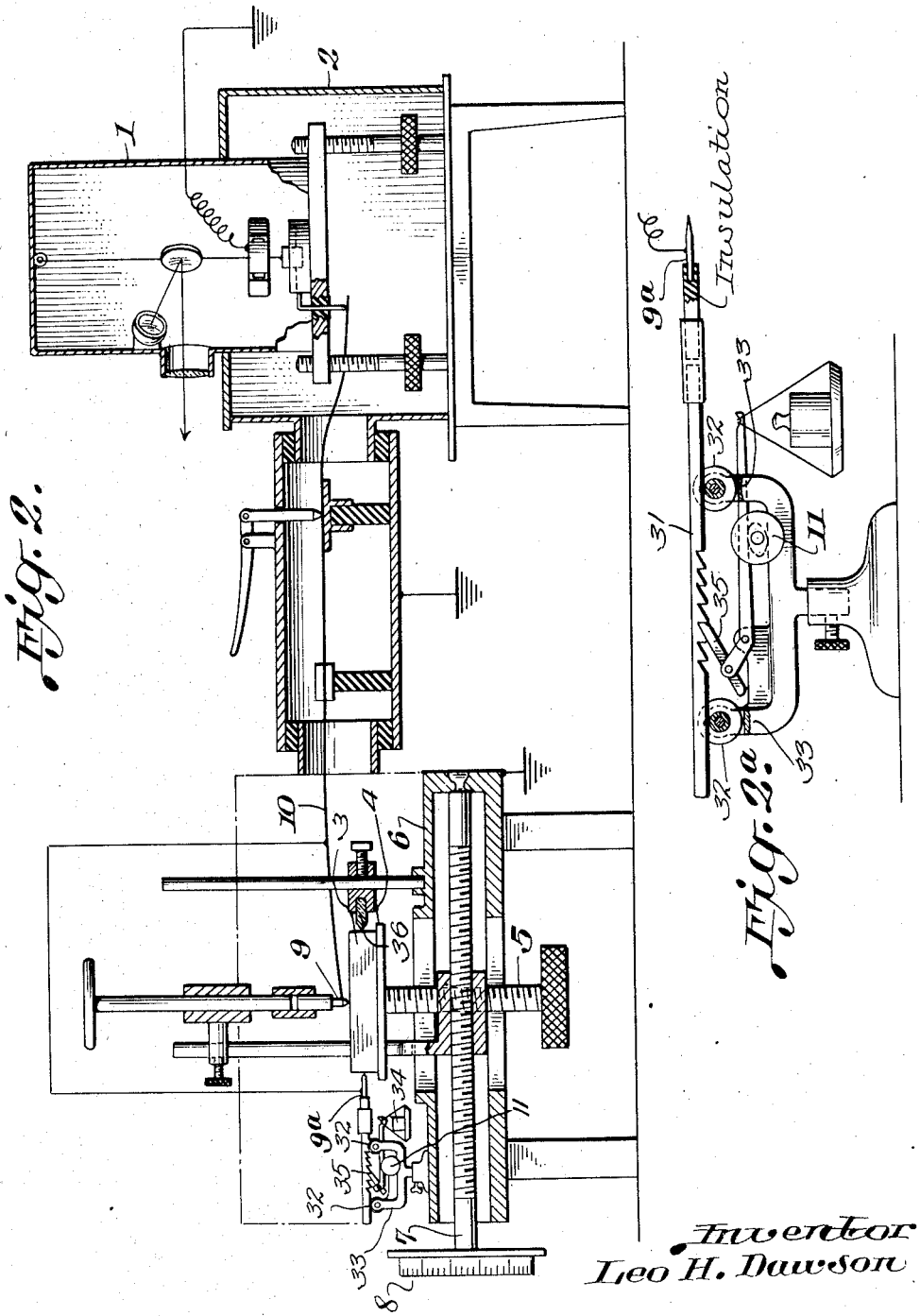

July 5, 1932. L. H. DAWSON 1,866,454
METHOD AND APPARATUS FOR DETERMINING THE DIRECTION
OF THE ELECTRIC AXES OF CRYSTAL QUARTZ
Filed Dec. 3, 1928 4 Sheets-Sheet 3
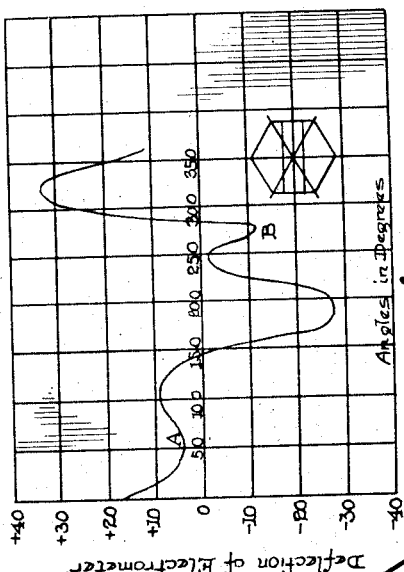
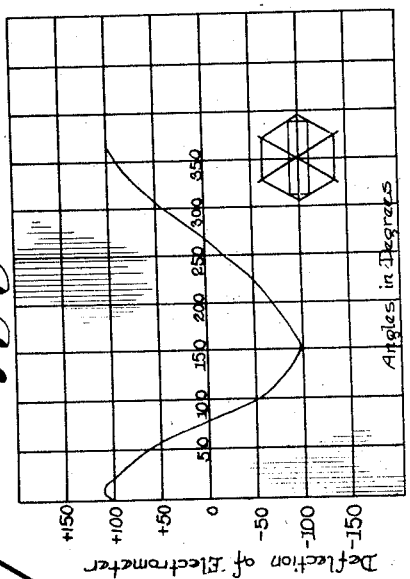
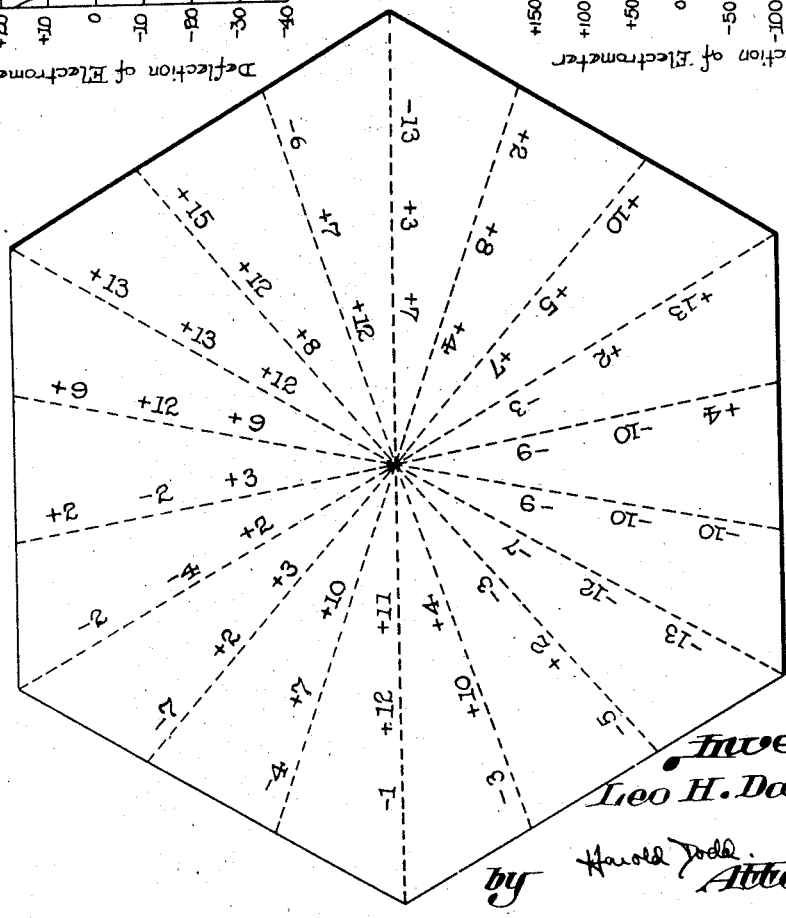
Inventor
Leo H. Dawson
by Harold Dodd
Attorney July 5, 1932.  L. H. DAWSON  1,866,454
METHOD AND APPARATUS FOR DETERMINING THE DIRECTION
OF THE ELECTRIC AXES OF CRYSTAL QUARTZ
Filed Dec. 3, 1928  4 Sheets-Sheet 4

Inventor:
Leo H. Dawson
by Harold Dodd Attorney

Patented July 5, 1932

1,866,454

UNITED STATES PATENT OFFICE

LEO H. DAWSON, OF WASHINGTON, DISTRICT OF COLUMBIA, ASSIGNOR, BY MESNE ASSIGNMENTS, TO WIRED RADIO, INC., OF NEW YORK, N. Y., A CORPORATION OF DELAWARE

METHOD AND APPARATUS FOR DETERMINING THE DIRECTION OF THE ELECTRIC AXES OF CRYSTAL QUARTZ

Application filed December 3, 1928. Serial No. 323,546.

My invention relates broadly to an improved method and apparatus for determining the direction of the electric axes of crystal quartz and more particularly to an electric method and apparatus for determining the direction of the electric axes of crystal quartz as distinguished from a visual examination of the crystallographic features of quartz.

One of the objects of my invention is to provide a method of electrically testing quartz preparatory to the cutting of piezoelectric plates from the quartz.

Another object of my invention is to provide a method and apparatus for determining the piezoelectric properties of quartz and facilitating the cutting of the quartz into plates with a high degree of precision with respect to the piezoelectric axes of the quartz.

Still another object of my invention is to provide a method and apparatus for cutting quartz with respect to the piezoelectric axes thereof, wherein a visual examination of the crystallographic features of the quartz is unnecessary for the accurate cutting of piezoelectric plates from the quartz.

Figure 1:
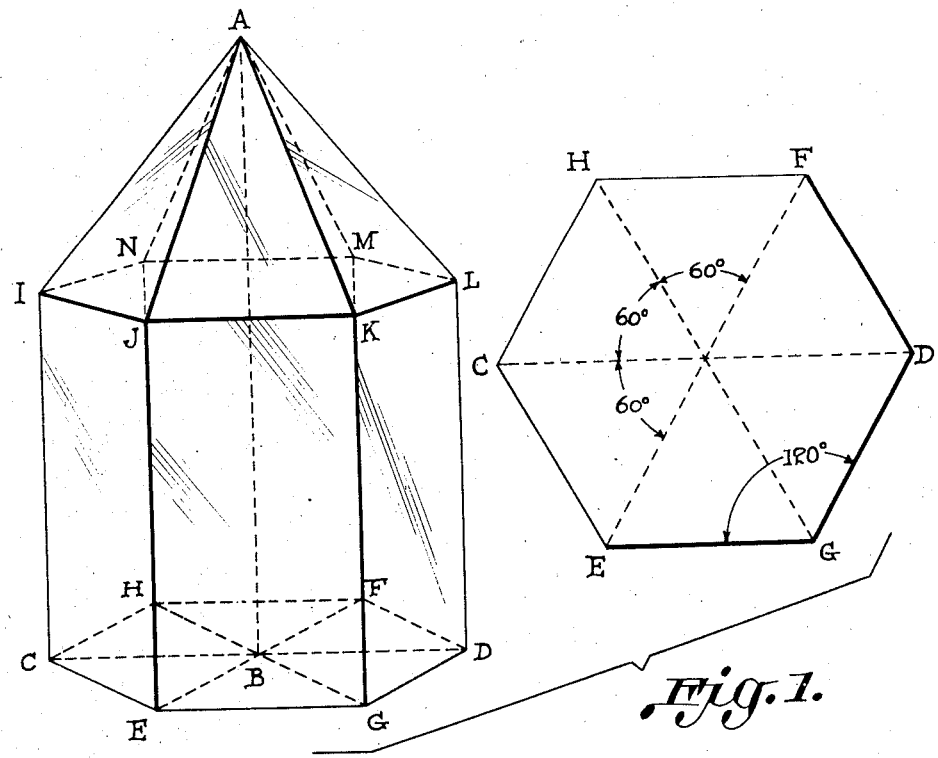
Figure 10:
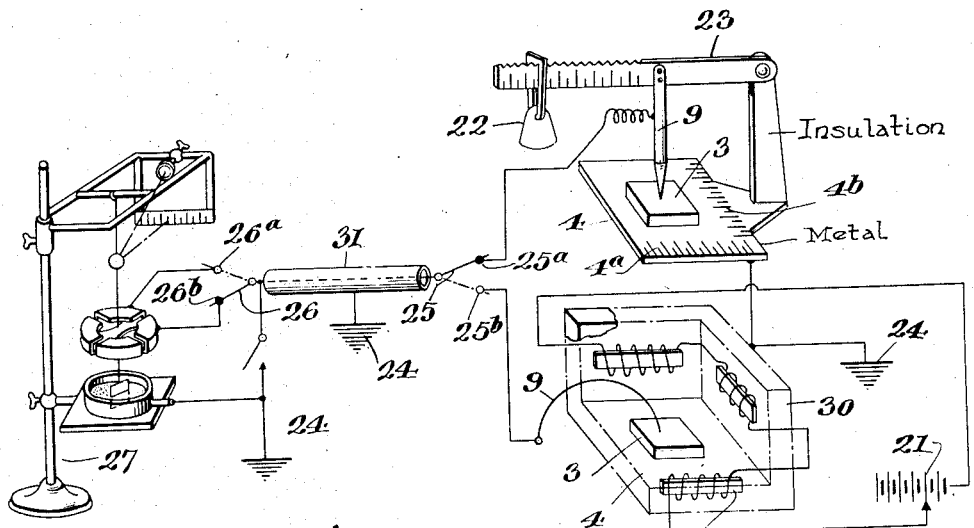

Other and further objects of my invention are directed to the novel method and construction of apparatus which I employ for the preparation of piezoelectric crystals upon a quantity basis with extreme accuracy as described more fully in the following specification by reference to the accompanying drawings, wherein:

Figure 1 shows diagrammatically the structure of a piezoelectric crystal; Fig. 2 is a side elevation of the quartz testing apparatus of my invention; Fig. 2a shows a portion of the apparatus of my invention which is employed for exerting pressure on the crystal; Figs. 3 to 9 show charts and diagrams of piezoelectric crystals showing the phenomena observed in carrying out my invention and Fig. 10 shows schematically the apparatus for determining the electrical axes of quartz crystals of my invention.

My invention on the method of preparing quartz crystal is the result of an investigation perhaps more extensive than has been hitherto attempted of the piezoelectric effect in crystalline quartz. The general laws of piezoelectric action, already well established, have been corroborated in full by the investigation but in addition many new and unsuspected facts have been discovered. The theory of the piezoelectric effect available at present, although adequate for a description of the more general laws, is apparently incapable of coping successfully with the new phenomena. It appears that the formulation of a complete theory must await a more comprehensive understanding of the molecular structure of quartz. Further, the piezoelectric effect at various temperatures has been measured and in this connection experiments on the pyro-electric effect have been performed.

At the outset, it will be understood that a crystal of quartz is in the form of a hexagonal cylinder surmounted by a hexagonal pyramid; the faces of the crystal, which may vary in length and breadth, lie at definite angles with each other. In Fig. 1, JEGK, GDLK, DLMF, MNHF, HNIC and CIJE are the sides of the hexagonal cylinder, the angle between any two adjacent sides is 120°. The faces of the hexagonal pyramid JKLMNIA lie at an angle of 51° 47¹ to the faces of the cylinder. The quartz crystal has four axes of symmetry namely, AB, CD, EF and GH, Fig. 1. AB is called in crystallographic terms, the trigonal axis, as there exists three symmetrical positions of the crystal at it is rotated about this axis. AB is also called the optic axis, because along this direction the crystal has unique optical properties. CD, EF and GH are diagonal axes of symmetry, for there are only two positions of symmetry as the crystal is rotated around each of these axes. CD, EF and GH are known as the electric axes, since a pressure applied to the crystal parallel to these directions produces a distribution of electrical charges on the surfaces of the crystal.

No complete historical summary of the many researches on the piezoelectric phenomenon will be attempted here, but some of the more important papers may be mentioned. I pass over the early qualitative experiments of W. C. Rontgen appearing in Annale der Physik und Chemie, NF19-20, 1883, 513, and direct attention to the more quantitative investigations of P. and J. Curie published in Comptes Rendu—XCI, 1880, in which were first brought out the laws governing the piezoelectric effect in quartz. These studies made on a rectangular parallelopiped of quartz cut in such a manner that one of the electric axes was perpendicular to one of the faces, led them to conclude that a force applied along the electric axis produced a charge on the faces perpendicular to this axis that was directly proportional to the force, a positive charge accumulating on one of the faces and an equal negative charge on the opposite face. A reversal of the sign of the force produced a reversal of the charges. The magnitude K of the charge, in c. g. s. electrostatic units, per square centimeter per dyne of force normal to the surface was found to be $6.32 \times 10^{-8}$ esu/cm$^2$ x dyne. This has been the accepted value. My investigations show that this value is not a constant for all quartz but varies very materially for different specimens of optically perfect quartz. This is in keeping with the general ideas of crystal imperfections as discussed later.

Pyroelectricity, which refers to the production of charge on the surface of a crystalline substance when heated has been regarded as really a piezoelectric effect arising from strains produced by unequal expansion with temperature, although there has been much controversy on the matter. There has been contributed a new and important view, that the piezo and pyroelectric phenomena are fundamentally different, and that the connection between them is not simple. This is borne out in a general way in the present work. From extensive study of the molecular structure of crystal quartz it may be concluded that pyroelectricty is due to the change of structure towards or away from hexagonal symmetry and that piezoelectricity is due to mechanical distortion of the uniaxial nature.

The apparatus of my invention is shown in Fig. 2 comprising a sensitive electrometer 1 with a sensitivity of about .004 V/mm. suitably shielded by an earthed brass cylinder 2. The quartz 3 under investigation is placed upon the circular platform 4. This platform is fixed in a horizontal position in such a manner that it can be rotated about the vertical axis 5 and the amount of rotation measured by a circular scale on member 6. A longitudinal motion may be given the platform 4 by the screw 7 and measured by the divided head 8. Thus any point of the quartz may be brought under the copper contact point 9. The contact point is connected to the electrometer through lead 10 and insulated throughout by fused quartz. The apparatus is thoroughly shielded electrically and switches are placed in the system. In some of my experiments, it was found desirable to apply or release the pressure on the quartz in a direction parallel to the plane of the platform 4. To accomplish this an instrument Fig. 2a is employed in which a quick application or release of pressure to the contact point is made by a suitably actuated cam 11. The pressure applying bar 31 is mounted for longitudinal movement on flanged rollers 32 journaled in the support 33, the weight 34 acting through lever 35 which engages notches in bar 31 to longitudinally force bar 31 to impart movement to contact 9a against the side of the piezoelectric crystal. To prevent physical displacement of the piezoelectric crystal on platform 4, an adjustable abutment 36 is insulatingly mounted on member 6 against which the side of the piezoelectric crystal abuts.

In order to raise the quartz to any desired temperature an electric resistance furnace with a metal core may be placed over the quartz and the core earthed, thus shielding effectually the quartz and contact point. To measure the temperature a calibrated chromel-nichrome thermo-couple is inserted in the furnace with the quartz.

The capacity of the system which varied during the investigation from 34 m. m. f. to 41 m. m. f. was compared with the capacity of a standard condenser by the heterodyne beat method, the measurements being reliable to less than 1%.

Experiments were undertaken to determine the character of the distribution of charge over the surface upon which the pressure was applied. Specimens of optically perfect quartz, were selected and cut in such a manner that the electric axis was normal to the large face of a parallelopiped 25 x 28 x 1 mm. Each crystal was placed on take 4, Fig. 2, and explored over the largest faces by releasing 100 grams pressure from the contact point which had an area of about $\frac{1}{10}$ mm$^2$.

In general one side of the crystal would give positive deflections while the opposite side gave negative deflections. Small areas of negative charge were often found on the faces which gave positive deflections over most of the face; and corresponding areas of positive deflections were found on the negative face. Large deflections might occur at the center of the quartz or at the edge and the deflection for one crystal was often twice that of another crystal. There seemed to be no uniformity of results.

The question arose whether such a distribution was of permanent character. To answer this a crystal was subjected to about 25 kilograms pressure for 20 seconds and the surface explored; no change in the distribution could be observed. The same crystal was then raised to a temperature of approximately 600° C., thus transforming it to the β-quartz and after allowing it to return to the α-quartz state, the surface was again explored. Again no change was observed. Thus the distribution seems to be permanent.

To substantiate further the above results, a piece of quartz cut in the above manner and about 150 mm. x 100 mm. x 3 mm. was subjected to the exploring test and again the charge was found to vary over the surface. The piece was then cut into three parts and each part explored, but no change could be observed in the character of the distribution of the original charge. Each part was examined optically and observed to be free from twinning and other defects.

These variations in the piezoelectric charge are naturally to be attributed to imperfections in the quartz crystal, although these imperfections may be so minute as to escape detection by the usual examination with polarized light. All that can be said is that the imperfections might be in the nature of small crystal fragments variously oriented in perhaps a random manner with respect to the large parent crystal, and that these little fragments are small in size, say less than 0.1 mm. in their largest dimension. It may be pointed out further that these imperfections may be very small, indeed such as would result from a displacement of a small group of molecules. Recent developments in X-ray analysis of crystals lead to the idea that crystals are not perfectly formed as hitherto supposed, but are constituted of a mosaic of more elementary perfect structures and that the axes of the more perfect crystals are not oriented in the same direction but may vary from a mean position. This explanation may account for the peculiar variation of the piezoelectric charge over the surface of quartz.

A cylindrical specimen of quartz 60 mm. in diameter and 30 mm. thick was cut from a rough piezo of quartz free from flaws and twinning and the apex of the crystal removed. An exploration of the distribution of the charge over the cylindrical surface was carried out by the application of a pressure of 1000 gms. directly to the exploring point which was placed perpendicular to the surface of the quartz. Care was taken to fasten the quartz cylinder concentrically on table 4, Fig. 2 and to have points of reference marked on it in such a manner that the data could always be referred back to the original specimen. The character of the distribution is shown in Fig. 3 where the abscissæ are the angles of rotation of the quartz which were read every degree and the ordinates are electrometer deflections.

There appears to be one well defined region of positive charge and another of negative charge, the magnitude of the deflections of each being about equal, but the size of the positive region is larger than that of the negative.

One peculiarity which seems to be characteristic of the curve is the decrease of the curve to a minimum at A and then a rise to maximum and finally a decrease to zero in the positive area and a similar phenomenon taking place in the region of point B in the negative area. It may be mentioned that the general characteristics of the curve always remained the same regardless of the method of holding the specimen to the plate.

Next a cylindrical crystal of the same dimensions but cut as indicated in Fig. 4 was placed concentrically on table 4. The results of a procedure similar to the previous case is shown in Fig. 4 and it can be seen that there are two well defined regions, one of positive charge and the other negative. The maximum deflection in both the positive and negative regions are of the same magnitude, but appear to occur about 150° apart and not 180°. The direction of the line dividing these areas lies more or less in the direction of the optic axis.

Figure 5:
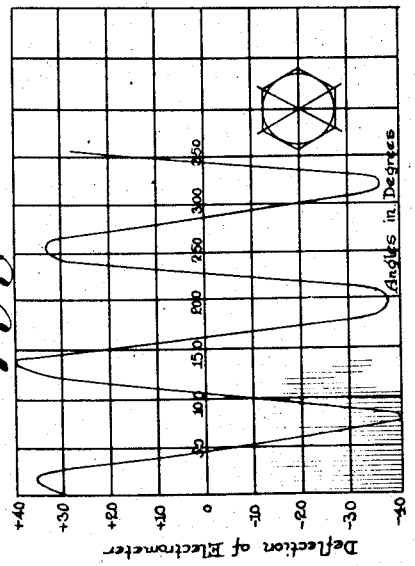

Finally, a crystal of the same dimensions as in the two previous cases was cut from a rough crystal in such a manner that the optic axis was normal to the ends of the cylinder. The exploration of the cylindrical surface was carried out in a manner similar to the two preceding cases, and the character of distribution of the charge is shown in Fig. 5. There are three positive maxima and three negative and they occur accurately 60° apart and are the same magnitude and alternate in sign. There are six points where the charge becomes zero and they lie 60° apart.

The above experiment serves as a new and precise method for determining the direction of the electric axes of a piece of quartz cut normal to the optic axis and in which there are no indications of the crystal form. The rough piece of quartz first must be examined for the optic axis and then cut into slabs of the desired thickness in which the optic axis is normal to the plane of the slab. The slab in which the directions of the electric axes are to be determined is placed on table 4 Fig. 2 and an exploration of the surface, more or less parallel to the optic axis, is carried out and the points of either maximum or minimum deflection observed. In most cases the latter is preferable as being more accurately determined. In case two diametrically opposite points can be determined, it is only necessary to draw a line joining them, but in case of the absence of the opposite point the lines must be drawn in the direction of pressure. Now it must be remembered that the direction of production of zero charge lies normal to the electric axis of the piece; therefore it is only necessary to draw lines perpendicular to the observed lines to locate the electric axis.

In many cases that may arise it is impossible to find a surface on the quartz which will be nearly normal to the direction of pressure; then it is possible to produce such a surface by grinding a semi-cylindrical notch in the side of the quartz in such a manner that the generator of the semi-cylindrical surface is parallel to the optic axis. Thus placing the quartz on the table 4 in such a manner that the center of the notch coincides with the center of rotation of the table, the exploring point can be brought in normal contact with this surface.

Many trials were made with this procedure of quartz samples in which faces were present and others in which faces were absent. In either case the electric axis could easily be determined within 2°.

Samples of quartz 20 x 25 x 2 mm. and 20 x 25 x 1 mm. were cut with an electric axis normal to the 28 x 25 side and the two faces in contact with the electrodes parallel to each other within .025 mm. Forces of 50, 100, 200, 500, 1000 and 2000 grams were applied to each in the direction of the electric axis and in such a manner as to be equaly distributed over the entire surface of the crystal. It was found after a few experiments that more consistent results could be obtained by sputtering the surfaces of the quartz in contact with the electrodes with platinum. Four samples of the results obtained are given in table 1 and are representative of the results obtained in many trials on different crystals.

Crystal Number 1 was first explored by the point method and it was found that while each surface produced charges of like character there appeared to be a variation of 250 per cent in the magnitude of the piezoelectric charge. No regularity of distribution could be detected on any of the crystals.

The crystal was then subjected to test for the production of piezoelectric charge over the entire surface. The resulting charge is given in Table 1, crystal 1a. The crystal was next cut into three pieces of unequal size and the piezoelectric charge of each measured with the resulting charge as given in $b, c, d$ Table 1. The largest of these three pieces was cut into two pieces and the charge determined $e$ and $f$ Table 1. It can be seen that the charge produced varies very markedly among the separate pieces and that the charge for the whole piece is smaller than that for any one.

In order to show the accuracy with which the measurements could be repeated, crystal Number 2 was measured on different days and under as nearly identical conditions as possible. Both the positive and negative faces tested with the result that the charge on the positive face appeared to be uniformly smaller than that on the negative as is shown in crystals $2a, b, c, d, e, f, g$ of Table 1. The results taken for the different days on the negative side of the quartz agree with each other within the limit of error than one would expect in this type of experiment, and the same may be said of the positive side.

As an example of the difference of charge produced on different samples of quartz, 3 and 4 of Table 1 are crystals cut from optically perfect material in as nearly the same manner as possible. They were subjected to test within a very few minutes of each other thus insuring as nearly identical conditions as possible, and it is seen from the table that they differ in charge by a large amount. This appears to be typical of the behaviour of quartz and is in agreement with the latest ideas of the structure of quartz:

*Table 1*

| Crystal number | Dimension in mm. of surface in contact with electrodes | Charge esu/cm²x dyne | Temp. |
|---|---|---|---|
| 1 (a) | 27 x 25 | $(-6.27\pm.23) \times 10^{-8}$ | 19.5° C. |
| (b) | 27 x 11½ | $(-6.37\pm.11) \times 10^{-8}$ | 24° |
| (c) | 16 x 12 | $(-7.18\pm.16) \times 10^{-8}$ | 24° |
| (d) | 11 x 8½ | $(-6.89\pm.10) \times 10^{-8}$ | 24° |
| (e) | 12 x 12 | $(-7.11\pm.16) \times 10^{-8}$ | 21° |
| (f) | 11½ x 12½ | $(-6.43\pm.18) \times 10^{-8}$ | 21° |
| 2 (a) | 27 x 25 | $(-6.05\pm.15) \times 10^{-8}$ | 19.5° C. |
| (b) | 27 x 25 | $(-5.88\pm.12) \times 10^{-8}$ | 21° |
| (c) | 27 x 25 | $(-6.16\pm.16) \times 10^{-8}$ | 19.5° |
| (d) | 27 x 25 | $(-6.42\pm.30) \times 10^{-8}$ | 19.5° |
| (e) | 27 x 25 | $4.94\pm.40) \times 10^{-8}$ | 19.2° |
| (f) | 27 x 25 | $5.38\pm.04) \times 10^{-8}$ | 19.0° |
| (g) | 27 x 25 | $5.47\pm.26) \times 10^{-8}$ | 19.0° |
| 3 | 27 x 25 | $(4.99\pm.04) \times 10^{-8}$ | 24° C. |
| 4 | 27 x 25 | $(6.41\pm.05) \times 10^{-8}$ | 24° C. |

In the above mentioned experiment on the variation of the piezoelectric effect with temperature, the specimen was placed on Table 4, Fig. 2 and the electric furnace placed over it. The apparatus was suitably shielded electrically and the temperature measured by a chromel - nichrome thermo - couple. The charge was produced by lifting a 500 gm. weight from the quartz. The temperature was varied by convenient intervals to a point well above 576° C., thus passing the transformation point of $\alpha$-quartz to $\beta$-quartz. The apparatus was brought to the desired temperature and allowed to stand until temperature equilibrium conditions had been reached. Six readings were taken and the mean of the six was used as the recorded result. Two crystals from different pieces of quartz were used.

Figure 6:
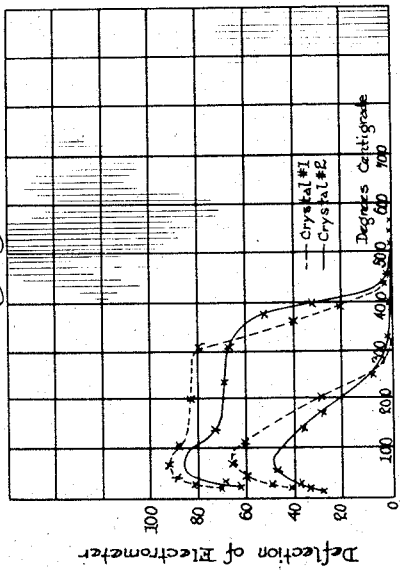

The curves in Fig. 6 exhibit the results, where the abscissæ are the temperatures of the quartz and the ordinates are electrometer deflections. The upper curves were taken with ascending and the lower with descending temperatures. It is seen that the curves for both crystals are of the same character, starting from approximately the same value at room temperature and rising to a maximum at about 60° C. From this maximum there is a slow decrease to around 300° C. Beyond 300° C. there is a very rapid decrease in the charge produced at about 440° C. in one case and 480° C. in the other. Beyond these points the effect is extremely small. In the neighborhood of 450° C. the effect has practically disappeared.

Upon cooling no deflection of the electrometer could be detected until the apparatus had cooled down to 280° C., and then there appeared a very rapid rise to a maximum value at 60° C. and from here to room temperature a decreasing charge was observed. The maximum reached on cooling was approximately one-half in one case and two-thirds in the other of the maximum reached on heating, and the resulting piezoelectric effect at room temperature after cooling was about one-half of the value of that before subjecting the crystal to heating. It was found that after the apparatus had remained untouched for 24 hours that both crystals had returned to their previous piezoelectric condition.

It was thought that the peculiarities of the curve might be due to the oxidation of the copper electrode, although this was very slight, but on substituting an aluminum rod for copper the same results were obtained. There were no thermo electric effects even when aluminum was used.

The maximum in the curve has no evident explanation and was not expected. The lag in the piezoelectric effect, however, is a phenomenon to be expected, since other effects of similar nature have been observed in the transformation of $\beta$-quartz to $\alpha$-quartz.

In order to obtain further information in regard to the pyro and piezoelectric production of electric charges on crystal quartz, the following experiments were undertaken. Until very recently experiments were conducted on the crystal structure of quartz, pyroelectricity was thought to be a manifestation of piezoelectricity brought about by stresses in the crystal due to heating and cooling.

A plate of quartz cut perpendicular to the optic axis when heated will have a distribution of electrical charges over the face perpendicular to the optic axis. The character of this distribution will be such that there are six alternate areas of positive and negative electricity, the points of maximum charge coinciding with the electric axes and points of zero charge coinciding with lines lying at 30° to the electric axes. When this charge is removed from the heated crystal by a flame and the crystal allowed to cool a distribution of electricity of like character is produced but with the signs of the charges reversed.

A section of hexagonal quartz crystal with sides approximately 20 mm. long and 7 mm. thick was cut perpendicular to the optic axis and placed on Table 4, Fig. 2, and heated to 200° C., the surface discharge with a flame and the quartz then allowed to cool to room temperature. The surface was then explored with the point, care being taken to locate the position of the exploring point with respect to a convenient system of axes. The results of these measurements are given in Fig. 7 in which the numbers indicate the sign and relative magnitude of the charges. It can be seen that the hexagon can be marked off roughly into six areas, three with charges of positive sign and alternating with these are the other three areas with charges of negative sign. The maximum charges appear roughly along the electric axes with lines of zero charge roughly along lines at 30° to the electric axes.

Pressure was applied uniformly by means of a circular clamp to the sides of a piece of quartz, 33 mm. in diameter and 12 mm. in thickness, cut perpendicular to the optic axis. When the circular surface was explored no charges or at least extremely small charges, were found. The clamp was then tightened with as great a force as possible and the surface again explored along the same line. In this case there appeared to be a distribution of charges of the same character as was produced by heating but much smaller in magnitude.

Figure 8:
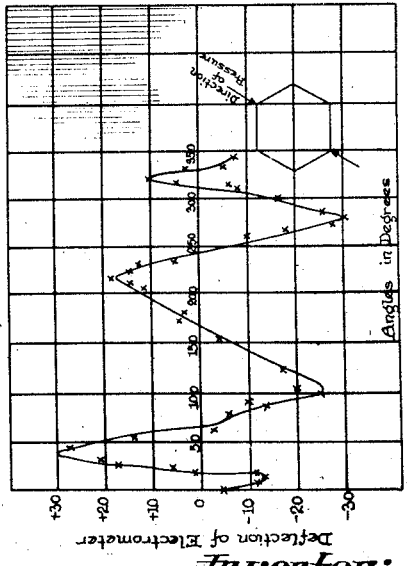

Pressure was applied in the direction of the electric axis to a hexagonal piece of quartz about 20 mm. on a side and 7 mm. thick and cut so that the plane of the hexagon was perpendicular to the optic axis. The surface perpendicular to the optic axis was explored in the usual manner. The results are shown in Fig. 8 in which the abscissæ are the angles of rotation of the quartz from the zero position and the ordinates electrometer deflections. It is seen that the distribution of charge is similar in character to that produced by heating or cooling as in Fig. 7.

Figure 9:
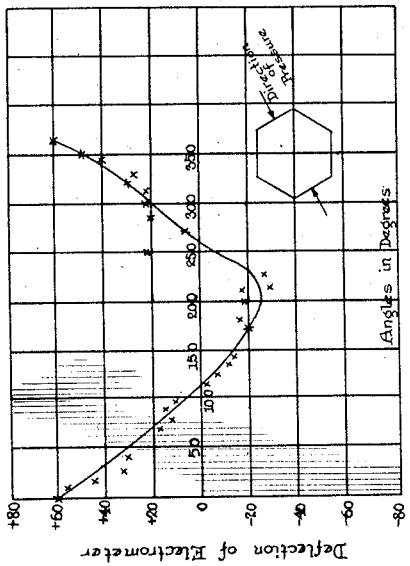

When the pressure was applied to the above hexagonal of quartz in the plane of the sample but at an angle of 30° to an electric axis an entirely different distribution of charge was produced. As Fig. 9 shows, that instead of finding six regions of electric charge there were but two areas of approximately equal size.

According to the prevalent ideas, pyroelectricity is due simply to the production of piezoelectricity brought about by the internal stresses in the quartz caused by the various coefficients of expansion in the different directions in the crystal. It would then be expected that the same distribution of charge over the face normal to the optic axis of the crystal when heated ought to be caused by the application of a force in any direction to the sides of the hexagon of quartz, at no time can the force be applied at an angle of more than 30° to the electric axis and therefore a component along the electric axis will always exist. But the two experiments described above show this not to be the case; therefore, it would appear that the distribution of electric charge over the surface brought about by pressure is in some way a different phenomenon than that brought about by heating and cooling.

The apparatus for determining the electrical axes of crystal quartz is schematically illustrated in Fig. 10 of the accompanying drawings. The piece of quartz 3 to be investigated is placed in metallic plate 4. Metallic plate 4 is provided with scales 4a and 4b, schematically respresenting the adjustments shown in Fig. 1 of the accompanying drawings. Metal plate 4 is electrically insulated from arm 23. Arm 23 supports searching contact 9. Movable weight 22 adjustably positioned on arm 23 schematically represents the pressure adjustment shown in Fig. 2 of the accompanying drawings. Searching contact 9 is electrically connected to switch member 25a. Metallic plate 4 may be electrically connected to electrometer 27 or may have a common ground connection 24 therewith. This schematically represents the pressure method. The temperature method comprises a receptacle 30 which may comprise six sides or any suitable construction desired. Contained in the base 4 and the sides of container 30 or in both the base and sides may be mounted heating units 20. Heating units 20 may be energized by any convenient source of energy 21. The crystal element 3 to be investigated is placed in receptacle 30 and explored with searching contact 9. Searching contact 9 is electrically connected to switch member 25b. Suitable adjusting mechanism for shifting the position of searching contact 9 could be employed as shown in Fig. 1. The sides of receptacle 30 are shown removed for clearness of illustration. Base 4 may be of metal and electrically connected to ground 24 or the entire receptacle 30 may be of metal and connected to ground 24. Switch arm 25 may contact with either switch member 25a or 25b depending upon whether the pressure or the temperature method is desired. Switch arm 25 is electrically connected to switch member 26. Switch member 26 may be arranged to reverse the polarity depending upon the design of electrometer 27 and the connections to the quartz crystal 3 under examination. Shield 31 surrounding the connecting wire may be connected to ground 24. Searching contacts 9 are moved over the surface of crystals 3 until maximum readings are obtained. The parts of the crystal 3 upon which searching members 9 are resting, when maximum readings of electrometer 27 are obtained, coincides with the electrical axes. The parts of the crystal 3 upon which searching members 9 are resting, when minimum readings are obtained, coincide with lines lying at 30° to the electrical axes.

I realize that many modifications of the apparatus and method for determining the electrical axis of quartz crystals are possible without departing from the spirit of my invention. It is obvious that the method and apparatus of any invention may be employed for investigating materials other than quartz and while the investigation of quartz crystals has been referred to in the foregoing specification it is to be understood that my invention is not limited thereby.

It is further understood that many modifications differing from those described in the foregoing specification and illustrated in the accompanying drawings are possible without departing from the spirit of my invention and it is not intended that the embodiments of my invention be restricted thereby but only as defined in the scope of the appended claims.

What I claim as new and desire to secure by Letters Patent of the United States is as follows:

1. The method for determining the electrical axes of crystals comprising the steps of cutting a section from said crystal the plane from which is normal to the optical axis, subjecting different areas of said section to a mechanical pressure, and indicating the piezoelectric effect at different points on said section of said crystal whereby the axes of maximum effect may be located.

2. The method of determining the axes of quartz crystals comprising, subjecting the crystal to mechanical pressure, placing an electrode adjacent to one side of said crystal, placing a searching contact on the other side of said crystal, connecting said electrode and said searching contact to a sensitive electrical energy indicating device and measuring the piezoelectric potentials existing on said crystal, whereby the axes of maximum piezoelectric effect may be located in said crystal.

3. The method of determining the axes of quartz crystals comprising, stressing said crystal and indicating the piezoelectric effect at different points on the face of said crystal whereby the axes of maximum effect may be located.

LEO H. DAWSON.